US00RE36587E

United States Patent [19]

Tanaka et al.

[11] E Patent Number: Re. 36,587

[45] Reissued Date of Patent: Feb. 29, 2000

[54] INFLATABLE SEAT BELT HAVING BAG FILTER

[75] Inventors: Yoshihiko Tanaka, Tokyo; Yoshinori Ohishi, Ohtsu; Tsuneo Chikaraishi, Hikone, all of Japan

[73] Assignee: Takata Corporation, Tokyo, Japan

[21] Appl. No.: 08/970,779

[22] Filed: Nov. 14, 1997

Related U.S. Patent Documents

Reissue of:

[64] Patent No.: 5,466,003
Issued: Nov. 14, 1995
Appl. No.: 08/269,365
Filed: Jun. 30, 1994

[51] Int. Cl.[7] ..... B60R 21/18

[52] U.S. Cl. ..... 280/733; 280/743.1

[58] Field of Search ..... 280/733, 728.3, 280/730.1, 730.2, 728.1, 729, 740, 743.1, 736

[56] References Cited

U.S. PATENT DOCUMENTS

| | | | |
|---|---|---|---|
| 3,682,498 | 8/1972 | Rutzki | 280/733 |
| 3,720,445 | 3/1973 | Bennett | 297/488 |
| 3,799,575 | 3/1974 | Kurze et al. | 280/743.1 |
| 3,801,156 | 4/1974 | Granig | 280/733 |
| 3,820,842 | 6/1974 | Stephenson | 280/733 |
| 3,830,519 | 8/1974 | Lewis | 280/733 |
| 3,841,654 | 10/1974 | Lewis | 280/733 |
| 3,843,151 | 10/1974 | Lewis | 280/736 |
| 3,848,887 | 11/1974 | Fox | 280/733 |
| 3,865,398 | 2/1975 | Woll | 280/733 |
| 3,866,940 | 2/1975 | Lewis | 280/733 |
| 3,888,503 | 6/1975 | Hamilton | 280/733 |
| 3,905,615 | 9/1975 | Schulman | 280/733 |
| 3,933,370 | 1/1976 | Abe et al. | 280/733 |
| 3,970,329 | 7/1976 | Lewis | 280/733 |
| 5,208,097 | 5/1993 | Honma et al. | 280/743.1 |
| 5,288,104 | 2/1994 | Chen | 280/733 |
| 5,303,953 | 4/1994 | Kamiyama et al. | 280/733 |
| 5,346,250 | 9/1994 | Kamiyama | 280/733 |
| 5,385,367 | 1/1995 | Tanaka et al. | 280/733 |
| 5,390,953 | 2/1995 | Tanaka et al. | 280/733 |
| 5,464,246 | 11/1995 | Castro et al. | 280/730.2 |
| 5,465,999 | 11/1995 | Tanaka et al. | 280/733 |
| 5,466,002 | 11/1995 | Tanaka et al. | 280/733 |
| 5,480,181 | 1/1996 | Bark et al. | 280/730.2 |

FOREIGN PATENT DOCUMENTS

| | | | |
|---|---|---|---|
| 42 35 338 | 4/1993 | Germany | 280/733 |
| 50-67520 | 6/1975 | Japan . | |
| 64-83436 | 3/1989 | Japan | 280/733 |
| 6-56001 | 3/1994 | Japan . | |
| 6-144138 | 5/1994 | Japan | 280/733 |
| 6-262994 | 9/1994 | Japan | 280/733 |
| 6-262995 | 9/1994 | Japan | 280/733 |

OTHER PUBLICATIONS

Hall, *The Standard Handbook of Textiles*, pp. 184–185.

*Primary Examiner*—Peter C. English
*Attorney, Agent, or Firm*—Foley & Lardner

[57] ABSTRACT

An inflatable seat belt apparatus is formed of an inflatable portion which is usually maintained in a band shape and has an envelope part inflated and deployed in a spindle shape by introducing gas generated by a gas generating device, the gas generating device acting in case of exceeding a predetermined threshold, a webbing having the inflatable portion extending over at least a range directly contacting with an occupant, a tongue fixed to an end of the inflatable portion and having a gas path from the gas generating device and a buckle to which the tongue is detachably engaged. The inflatable portion has an elastic inflatable unit inserted into the envelope part and is inflated and deployed by introducing the gas generated by the gas generating device into the elastic inflatable unit via a filter.

18 Claims, 7 Drawing Sheets

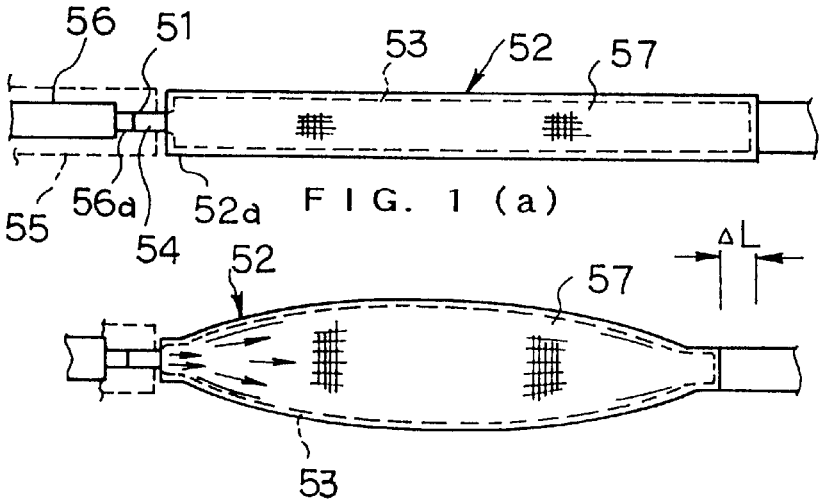
FIG. 1 (a)
FIG. 1 (b)
PRIOR ART
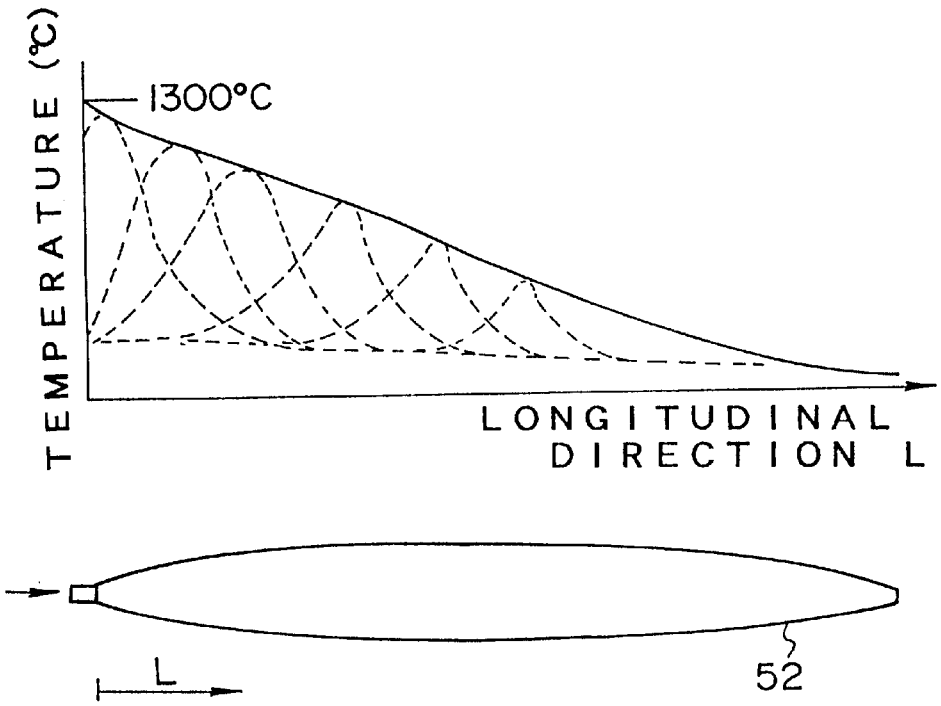
FIG. 2
PRIOR ART

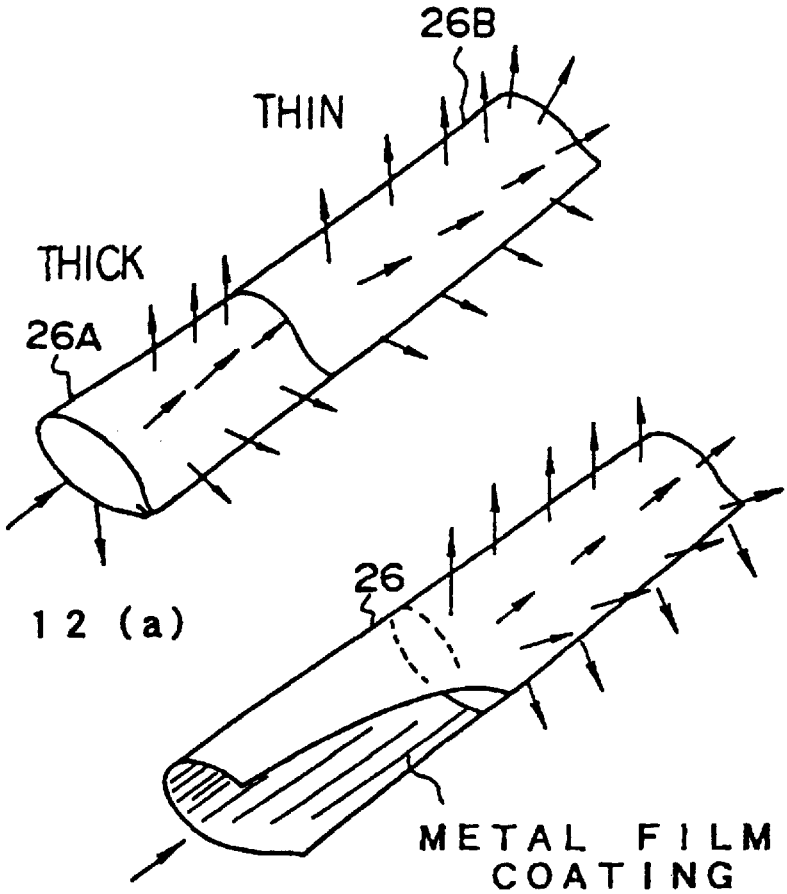
FIG. 12 (a)
FIG. 12 (b)
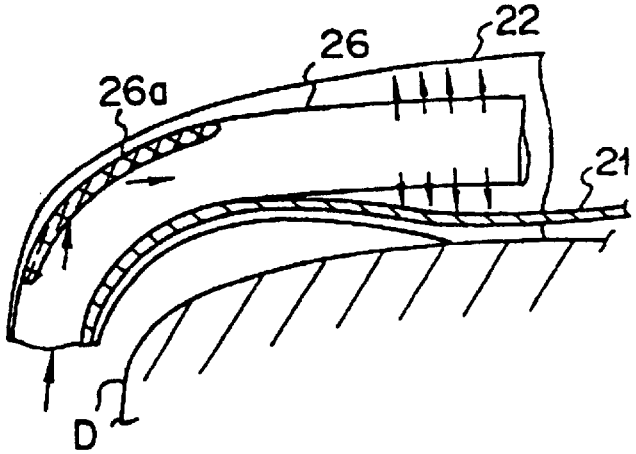
FIG. 13

INFLATABLE SEAT BELT HAVING BAG FILTER

Matter enclosed in heavy brackets [ ] appears in the original patent but forms no part of this reissue specification; matter printed in italics indicates the additions made by reissue.

BACKGROUND OF THE INVENTION

The present invention relates to an inflatable seat belt apparatus, more particularly to an inflatable seat belt wherein a webbing of a seat belt apparatus to restrain an occupant has an inflatable structural portion formed in an envelope shape which is usually maintained in a band shape and is inflated, in an accident in a predetermined form to withstand high temperature gas spouted from a gas generating means.

Presently, a seat belt apparatus is necessary for a vehicle or the like as an apparatus for securing in occupant's body, which restrains the occupant from sudden movement by a deceleration and an impact in a crash.

Such a seat belt apparatus comprises a webbing as a woven belt made of a fabric which has approximately a 50 mm width and is formed according to Japanese Industrial Standard, a retractor (hereinafter referred to ELR: Emergency Locking Retractor), a buckle, a tongue, an anchor and so on. The ELR winds the webbing by a winding force of a spring and locks the webbing from withdrawing only at a crash so as to restrain the occupant. The buckle is mounted on a suitable position near the floor so that the webbing fits the occupant's body well.

Conventionally, the seat belt apparatus locks the webbing from withdrawing by the function of ELR at a crash to restrain the occupant from a forward movement.

For improvement in the efficiency of restraining the occupant, each of U.S. Pat. Nos. [3,841,645]*3,841,654*, 3,865,398 and 3,866,940 discloses a seat belt apparatus in which the webbing has a portion formed in an envelope shape made of a fabric. The portion is folded like bellows and is banded by a weak adhesive so as to usually [maintain] *remain* in a band shape, or the portion is folded in the band shape by fastening means such as a fastener, so that, in a crash, the portion formed in the envelope shape is inflated and deployed by a spouted gas from a gas generator connected to the webbing.

According to the seat belt apparatus having the inflatable structural portion formed in an envelope shape (hereinafter, it is called as "an inflatable seat belt apparatus"), force applied to the occupant can be distributed over the range wider than the conventional webbing so as to decrease the stress applied to the occupant and a higher safety efficiency can be provided.

The inflatable seat belt apparatus is effective even for a rear seat. For mounting an air bag apparatus for an occupant on the rear seat, the air bag apparatus is generally mounted on the rear side of the back portion of the front seat. It is necessary that the front seat structure has a high rigidity for suitably operating the air bag apparatus for the rear seat to efficiently restrain and secure the occupant. However, it is difficult to provide a reclining function having a movable portion to the front seat if the air bag apparatus is mounted on the rear side of the back portion of the front seat. Therefore, the inflatable seat belt apparatus is quite effective for the rear seat because the inflatable seat belt apparatus can be independently mounted on the rear seat and has no restriction such as the air bag apparatus.

In the inflatable seat belt apparatus mentioned above, the gas generator operates according to an operation signal from a sensing unit such as an acceleration sensor sensing an impact at a crash and the envelope shape inflatable portion is then substantially instantaneously inflated and deployed in a predetermined form.

Because it is necessary to immediately spout a gas to the inflatable portion similar to the air bag apparatus, the gas generator may be a device for generating a compressed gas or compressed air filled in a compression container such as a cylinder. The compressed gas may be nitrogen or carbon dioxide gas. In case of using the compressed air, a small compressor is generally mounted.

The inflatable portion of the inflatable seat belt apparatus has a capacity which is about 1/6–1/7 of the air bag apparatus. Further, the cylinder or the like which is smaller than the air bag apparatus is enough for the inflatable seat belt apparatus.

However, the inflatable seat belt is necessary to be equipped with a device for attaching and detaching the cylinder and a device for preventing the gas from leaking. The gas pressure should be inspected periodically.

Recently, [the] most air bag apparatus [has the] *use a* gas generator (hereinafter, [we call] "inflator") which is a device for instantaneously generating a gas by using [a] rapid combustion of a compound.

The inflator receives, first, an operational signal from the acceleration sensor at a crash to act as a trigger for the electrical squib, and activates an igniter by an electrical squib[;]. Then, a propellant burns to rapidly generate gas.

The propellant may be sodium azide [(NAN3)] ($NaN_3$) which is well known as a propellant and generates nitrogen gas by combustion.

In the conventional inflatable seat belt apparatus, a thick fabric is folded, and the inside of the fabric is coated with silicone rubber to provide high airtightness for the envelope shape portion. Also, the inflator is provided with a simple filter for cooling the inside thereof to lower the temperature of the introduction gas, so that the high temperature gas from the inflator is directly introduced into the envelope shape portion.

[The applicant has already disclosed an invention of the] *Disclosed in commonly-owned Japanese patent applications are* inflatable seat belt apparatus, wherein the envelope shape portion is formed from a knitted textile and has an inflatable unit made of a rubber tube and situated inside thereof (*see* Japanese Patent [Applications] *Application* No. 210353/1992, *publication no. 6-144138, published on May 24, 1994; Japanese Patent Application* No. 210355/1992, *publication no. 6-56001, published on Mar. 1, 1994*). [Furthermore, the applicant has already disclosed an invention of the] *Disclosed in another Japanese patent application is an* inflatable seat belt apparatus, wherein the envelope shape portion is formed from a fabric having expandable wefts and has an inflatable unit made of a rubber tube and situated inside thereof (*see* Japanese Patent Application No. 78623/1993, *publication no. 6-262994, published Sep. 20, 1994*).

According to the above mentioned inventions, when the occupant wears the inflatable seat belt apparatus, the envelope shape portion is maintained in a thin band shape as compared with the conventional inflatable seat belt apparatus in which the thick fabric is folded. Furthermore, in an emergency, the envelope shape portion can be quickly inflated and deployed without fail.

FIG. 1(a) illustrates an example of the inflatable seat belt apparatus, wherein a shoulder belt is formed of a knitted textile and has an inflatable unit made of rubber tube and situated inside thereof.

In this figure, numeral 51 designates a tongue. The tongue 51 has a gas inlet 54 as an inlet for introducing the gas into a rubber tube 53 arranged in the belt 52. The gas inlet 54 is coupled to a gas outlet 56a of gas generating means (inflator) 56 situated inside a buckle 55 when the tongue 51 is engaged with the buckle 55 for fixing a belt end 52a.

FIG. 1(b) exemplifies a state of a belt 52 inflated and deployed in a predetermined form. The propellant in the inflator 56 is burned to generate a reacted gas, and the gas is introduced into the rubber tube 53 of the belt 52 through the gas inlet 54, so that the belt is inflated and deployed in the predetermined form.

As the gas is rapidly introduced into the rubber tube 53, the rubber tube is inflated as shown in the FIG. 1(b). The shape of the whole inflatable portion is controlled by a knitted textile structure 57 formed in an envelope shape which covers the rubber tube 53. The inflatable portion has a spindle shape. Because the area of the belt portion touching the chest and the like of the occupant is increased, an impact applied to the occupant is [soften] *softened*.

Because the inflatable portion formed in the envelope shape is radially increased, the length of the belt in a longitudinal direction is shortened by $\Delta L$. Therefore, the inflatable seat belt apparatus has a function as a pretensioner which holds the occupant more effectively.

In the inflatable seat belt apparatus of this kind, the gas spouted from the inflator is introduced into the tube with a high temperature and high pressure condition as soon as the gas is generated.

FIG. 2 is a temperature distribution diagram exemplifying a result of the temperature distribution within the tube at this stage. The figure also shows the inflatable portion in an inflated condition to indicate the relative position.

At this stage, the inside of the tube has a highest temperature at a tongue portion near the gas inlet as shown in FIG. 2. In the longitudinal direction L, respective temperatures appear with introduction of the gas as shown by the dotted lines. The solid line shows a curve tracing the respective temperatures.

The gas generated by the combustion in the inflator has quite high temperature. However, because the temperature drops along the longitudinal direction, the tube works efficiently if it can withstand the high temperature only for a very short period.

Silicone rubber with a heat resistance has been adapted to the tube for receiving the high temperature gas to withstand the high temperature in the tube.

However, many cinders are produced by the combustion of the propellant of the inflator. The cinder is mainly fine carbon powder. The cinders are spouted into the tube with the reaction gas.

Because the cinder has a high temperature and has a large heat capacity compared with the gas, the cinder harms the rubber surface of the tube when the cinder collides with the inner surface of the tube. When the rubber surface is badly harmed, there is a possibility of making a hole in the tube.

SUMMARY OF THE INVENTION

It is therefore an object of the present invention is to solve the above mentioned conventional problems and to provide an inflatable seat belt apparatus having a high safety, wherein a tube of an inflatable belt portion is not damaged even if the tube is exposed to high temperature gas.

For overcoming the above mentioned object, this invention provides an inflatable seat belt apparatus comprising: an inflatable portion which is usually maintained in a band shape and has an envelope part inflated and deployed in a spindle shape by introducing a gas generated by gas generating means, the gas generating means acting when exceeding a predetermined threshold, a webbing having the inflatable portion extending over at least a range directly contacting with an occupant, a tongue fixed to an end of the inflatable portion and having a gas path from the gas generating means, and a buckle with which the tongue is detachably engaged, wherein the inflatable portion has an elastic inflatable unit inserted into the envelope part and is inflated and deployed by introducing the gas generated by the gas generating means into the elastic inflatable unit via a filter.

The elastic inflatable unit is inserted into the envelope part in the inflatable portion and the filter is inserted into the elastic inflatable unit. Thus, the inflatable seat belt apparatus is inflated and deployed by introducing the gas generated by the gas generating means.

Therefore, the high temperature and high pressure gas can be lowered and the cinder having high temperature can be collected by the filter so as to prevent the elastic inflatable unit from melting and breakage by gluing the cinder discharged with the gas introduced into the elastic inflatable unit onto the inner surface of the elastic inflatable unit.

In this case, the filter is preferably a cylindrical bag filter inserted into the elastic inflatable unit. Thus, the temperature of the gas can be lowered along the longitudinal direction of the inflatable portion and the cinder can be collected with a wider area so as to prevent the filter from binding. Therefore, the inflatable portion can be inflated and deployed without fail.

Further, the bag filter is preferably formed of a woven fabric of heat resistant fiber.

Furthermore, the elastic inflatable unit is preferably a silicone rubber tube.

BRIEF DESCRIPTION OF THE DRAWINGS

FIGS. 1(a) and 1(b) are explanatory drawings showing conditions that an inflatable seat belt apparatus having an inflatable portion formed from a knitted textile structure is inflated;

FIG. 2 is a simplified temperature distribution diagram showing a distribution of gas temperature in the inflatable portion of the inflatable seat belt apparatus as shown in FIG. 1(a);

FIGS. 12(a) and 12(b) are simplified perspective views showing an altered example of a bag filter according to the present invention; and FIG. 13 is an explanatory drawing exemplifying a gas flow in the bag filter.

DETAILED DESCRIPTION OF THE PREFERRED EMBODIMENTS

Embodiments of an inflatable seat belt apparatus according to the present invention are now described referring to the attached drawings.

Figure 3:
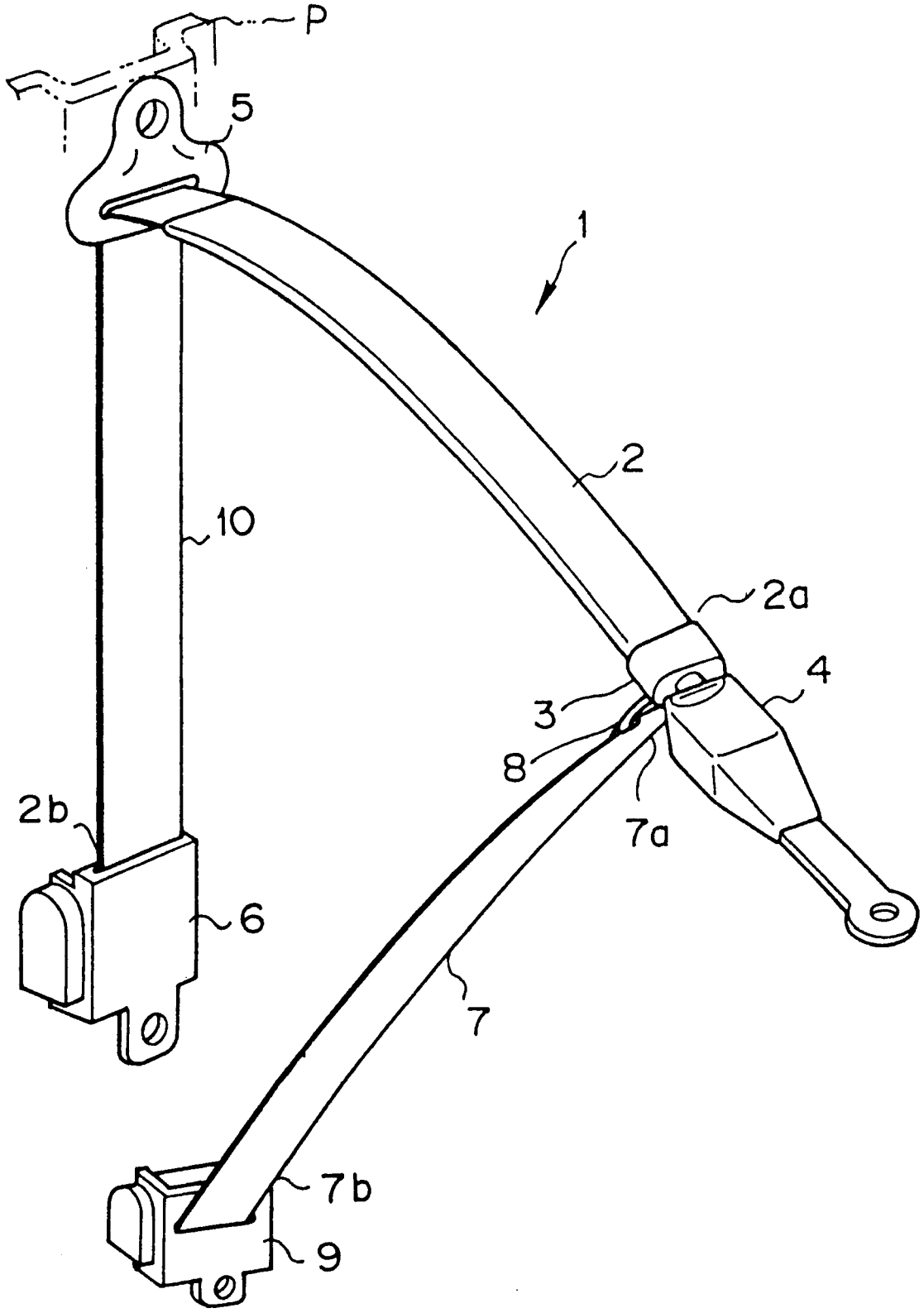
FIG. 3 is a simplified structural view showing an inflatable seat belt apparatus of an embodiment according to the present invention.

FIG. 3 is a simplified perspective view showing a whole structure of the inflatable seat belt apparatus 1. This figure illustrates [for clarifying relationships between] respective components of the inflatable seat belt apparatus applied to the right side front seat.

In this figure, numeral 2 designates a shoulder belt. The shoulder belt 2 has an end 2a to which a tongue 3 is fixed. The shoulder belt 2 is engaged and fixed to a buckle 4 fixed to a predetermined position near the floor between the right and left front seats via the tongue 3 and has the other end 2b downwardly guided through a slip guide 5 or a pillar anchor mounted on a pillar P. The pillar anchor is adjustable in upper and lower directions. The shoulder belt is thus hung around and from the slip guide 5 to be wound up in an ELR 6 arranged near the floor.

A lap belt 7 has an end 7a fixed to an anchor plate 8 fixed to a mouthpiece of the tongue 3 and has the other end 7b wound in the ELR 9 mounted near the floor of the door side beyond the seat cushion.

[The description will now be made as regard to details] *Details* of the *respective* structures of the shoulder belt, peripheral components of the tongue, and the buckle, [respectively] *will now be described*.

The shoulder belt 2 comprises the end 2b wound and accommodated in the ELR 6, the other end 2a connected to the tongue 3, and a piece of webbing 10 has a through or integral member as shown in FIG. 3. In this embodiment, for the webbing 10, a band shaped belt having a 50 mm width and a 1.6 mm thickness is used. The webbing 10 may be formed of polyester finished yarn tightly woven by twilling, plain weaving or the like. The webbing 10 is equivalent to a conventional seat belt apparatus. The webbing 10 has a section between an abdominal region and a right shoulder region which directly touches the body of an occupant, wherein the section is covered by a cylindrical cover 20 made of a cloth and formed to have a slight thickness.

In the inside of the portion having the slight thickness, several kinds of envelope shape or elongated members are accommodated overlappingly.

Figure 4:
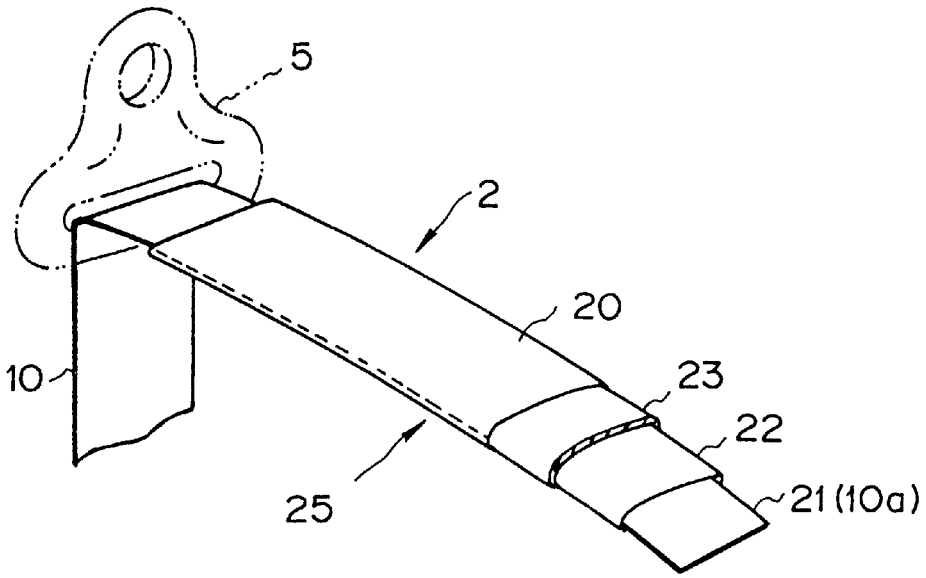
FIG. 4 is a perspective partial view magnifying and exemplifying the inside of the inflatable portion shown in FIG. 3.

In FIG. 4, numeral 10a shows that the webbing 10 is positioned within the cover 20. Because of the difference of the functions, this portion of the belt is called an inner belt 21, the portion of the belt which is exposed outside and is wound into the ELR is called the webbing 10, and these portions are designated by the different numerals 10 and 21, respectively.

Figure 8:
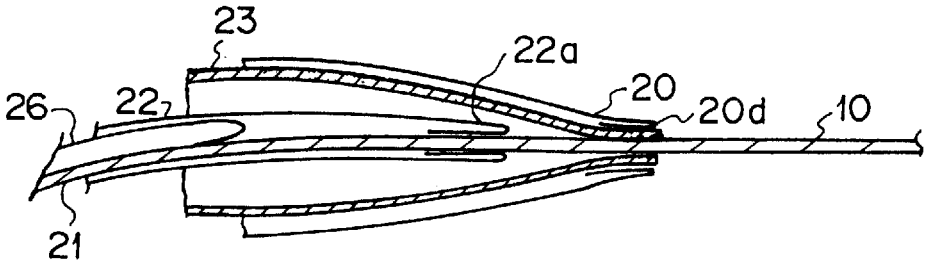
FIGS. 8(a) and 8(b) are partial vertical sectional views showing an end of the inflatable portion near a slip guide side.
Figure 8:
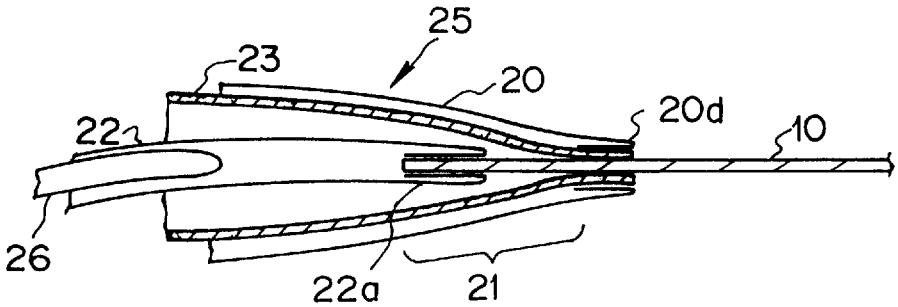

The inner belt 21 is inserted in a flat condition into a tube 22 formed of a thin film and made of silicone rubber as shown in FIG. 4. The tube 22 made of silicone rubber is cylindrical and has an end 22a fixed to a predetermined position of the inner belt 21 to maintain the airtightness as shown in FIG. 8(a). Therefore, the tube 22 is inflated in a long and slender cylindrical shape as gas is introduced into the tube 22.

This tube 22 is accommodated in a cylindrical knitted textile member 23 of flat type which is knitted in a size slightly larger than the tube 22. In this embodiment, the knitted textile member 23 is constituted by a tubular knitted textile using a polyester finished yarn (1500 denier). The knitted textile member 23 of the tubular knitted textile has a characteristic *by* which *it* is hardly expandable in the longitudinal direction of the belt ([wrap] *warp* direction of the knitted fabric) and is easily expandable in a direction (weft direction of the knitted fabric) *so* that the circumference of the cylindrical shape is increased.

The cloth cover 20 as described above is arranged to wholly cover the knitted textile member 23 of a cylindrical shape. The knitted textile member 23 and the cover 20 are firmly sewn together with the inner belt 21 as shown in FIG. 8(a).

Preferably, a material for the cover 20 does not show the crease in the belt and is soft to the touch because the cover 20 is a portion directly touched with the hand of the occupant and directly contacts with the clothes of the occupant. In this embodiment, a tricot knit fabric knitted by warps with polyester finished yarns is employed for the cover 20.

The thick portion has the inflatable tube 22 with the inner belt 21 as a core, and the end connected to the gas generator via the tongue 3 so as to be inflated and deployed by the gas introduced in a very short period of time after a crash. Therefore, the inflatable seat belt apparatus can efficiently restrain the occupant from movement. In this specification, "inflatable portion" will be denoted instead of a whole set of the inflatable member hereinafter.

In addition to the embodiment described above, this invention may be accomplished by the following modified components of the inflatable portion.

For the tube 22, a rubber material which has high elasticity even against a rapid inflation and has heat-resistance because the high temperature gas is filled in the inside of the tube 22 is suitable for [using. The] *use. A* material having rubber-like elasticity may be used for the tube 22. The material may be, for example, various kinds of thermoplastic elastomer, urethane rubber, fluorocarbon rubber, rubber/blended rubber or the like.

The knitted textile member 23 is constituted by [the] *a* tubular knitted textile having no seam for forming a cylindrical shape in the above mentioned embodiment. The stitch may be plain stitch, rib stitch, pearl stitch, interlock stitch or the like. In this case, the elongation of the knitted textile member 23 in the weft direction is changeable by [charging] *changing* a density of weft knitted loops [into] *in* the [wrap] *warp* direction.

The knitted fabric of a flat type is made by plain weave. In this case, it is possible that [2] *two* sheets of the knitted fabrics in a long and slender shape are overlapped and the ends of the knitted fabrics are sewn together to make a cylindrical form, and that both ends of the knitted fabric are sewn together to make a circular form. *Upon inflation, the knitted fabric expands in a direction transverse to the longitudinal direction of the webbing 10 to pretension the webbing 10, for example, in a manner similar to that illustrated in FIGS. 1(a) and 1(b).*

A cloth employed for the cover 20 may be a plain weave fabric using a nylon yarn or polyester yarn.

Besides the materials as described above, other material such as a resin film, an artificial leather or the like is considered to be employed for the cover if the material satisfies the conditions of the feel, the stiffness, the persistence and so on.

Figure 5:
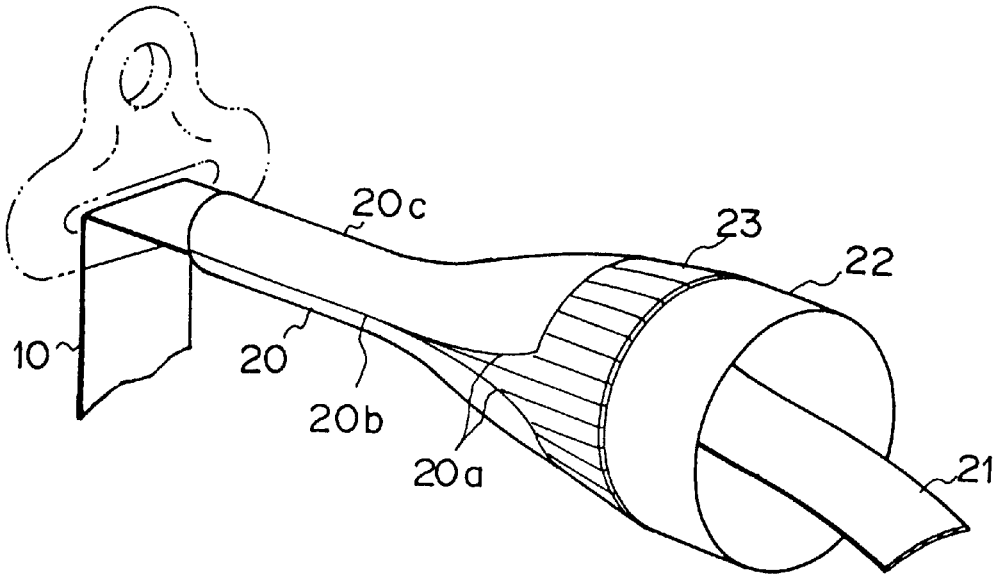
FIG. 5 is a perspective partial view exemplifying the inside of the inflatable portion when the inflatable seat belt apparatus shown in FIG. 4 is inflated and deployed.

FIG. 5 is a perspective view for understanding the inside of the inflatable portion shown in FIG. 4 when the inflatable seat belt apparatus is inflated and deployed.

As shown in this figure, the tube 22 is inflated by the introduced gas, and the knitted textile member 23 constituted by the tubular knitted textile is elongated in the radial direction in a cylindrical shape. When the predetermined inner pressure is applied, a portion of the thread sewing the cloths of the cover 20 is torn. A seam 20a of the cover is then opened like a mouth, and the tube 22 covered by the knitted textile member 23 is inflated in a spindle shape to be forced out from the opening of the seam 20a.

While, because a seam 20b of the cover 20 is sewn firmly at a predetermined range on the pillar anchor side of the inflatable portion 25 and at a predetermined range on the tongue 3 side, the inflation of the tube 22 is limited by a cover portion 20c of the cover 20, so that the cover portion 20c is inflated only in a long and slender cylindrical form (a diameter of the cylindrical form is approximately 3.6 cm in this embodiment).

The length in the longitudinal direction of the belt is shortened because the inflatable portion 25 is inflated in a spindle shape. At this point, because the knitted textile member 23 of the inflatable portion 25 receives a tensile force in the longitudinal direction of the belt, the inner belt 21 does not receive the tensile force, so that the inner belt 21 is loose.

Figure 6:
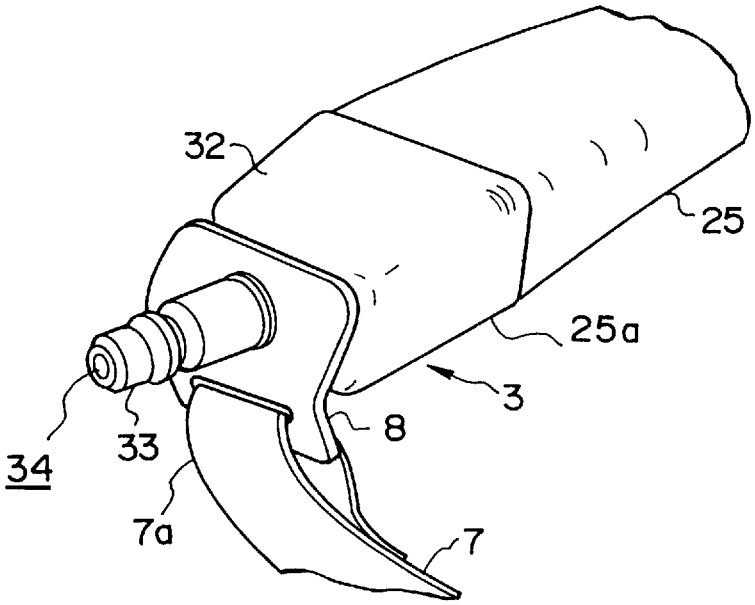
FIG. 6 is a perspective view showing a fitting structure between a tongue and an end of the inflatable portion.
Figure 7:
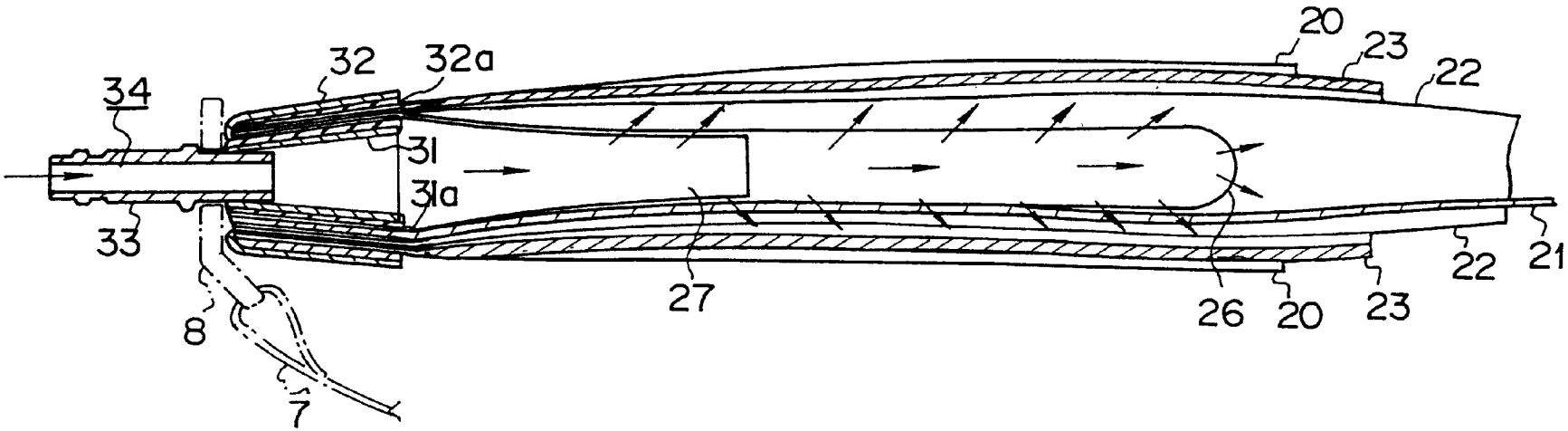
FIG. 7 is a longitudinal sectional view showing an arrangement of the components of the inflatable portion.

Referring to FIG. 6 and FIG. 7, [the description will now be made as regard to] details of the fitting structure between the inflatable portion 25 and the tongue 3 provided with the gas inlet, [and to] *as well as* a structure of a bag filter *will now be described*.

FIG. 6 is a perspective view showing the connecting portion between the tongue 3 and the inflatable portion 25. In FIG. 6, an end 25a of the inflatable portion 25 is fixed to cover an end fitting 31 made of metal which has a flat square section. Furthermore, the end 25a is fixed firmly by a caulking fitting 32 so as to cover the periphery thereof so that the inflatable portion 25 is not easy to be broken away from the end fitting 31.

The end fitting 31 has a tongue pipe 33 secured to the distal end thereof. The tongue pipe 33 is inserted and engaged with a buckle body of the buckle 4 (not shown). The tongue pipe 33 has a gas path 34 formed inside thereof. The gas from an inflator (not shown) is introduced into the inflatable portion 25 through the gas path 34 and the inside of the end fitting 31.

The tongue 3 is integrally structured by a combination of the end fitting 31, the caulking fitting 32, and the tongue pipe 33 in this embodiment.

The tongue pipe 33 has a lap belt anchor plate 8 fixed to the bottom part thereof to secure an end 7a of a lap belt 7 constituted of a normal webbing.

FIG. 7 is a longitudinal sectional view showing the inside of the inflatable portion.

As shown in FIG. 7, each component, i.e. the inner belt 21, the bag filter 26, the tube 22, the knitted textile member 23 and the cover 20, of the inflatable portion 25 is overlapped to the peripheral portion of the end fitting 31 coated by a rubber coating 31a to tightly connect with each other *and thereby form a laminate* (*i.e., layered*) *structure*.The caulking fitting 32 having an inside coated by a rubber coating 32a is fixed to the peripheral portion of the inflatable portion.

Since the inflatable portion 25 is structured as described above, the inflatable portion 25 is maintained sealingly at the end 25a thereof and a break or a breakage of the end fitting 31 is not possible even if the reaction gas having high pressure is rapidly introduced into the inflatable portion 25.

The structure of the bag filter 26 will now be described referring to FIG. 7.

The bag filter 26 is a filter formed of a fabric having high air permeability which is sewn in an envelope form. The filter has substantially the same width as the width of the inner belt 21 and is choked at a distal end side thereof. The bag filter 26 is inserted into the tube 22 and has an end fixed to the tongue 3. Furthermore, a skirt 27 is inserted into the bag filter and has a length which is one third of the length of the bag filter 26. The skirt 27 is cylindrical, and opens at a distal end thereof and is formed of the same fabric of the bag filter in this embodiment.

The bag filter 26 and skirt 27 are made from heat-resistant fiber in this embodiment. For example, the heat-resistant fiber may be aramid fiber. The aramid fiber is well known as a trade mark Kevlar™ fiber and has high stiffness and high elasticity. Further, the aramid fiber has good heat resistance and good flame tightness and starts carbonizing at approximately 500° C., so that the aramid fiber does not melt and burn even at a high temperature.

Though the Kevlar™ fiber employed in this embodiment is para-bond aramid fiber, meter-bond aramid fiber may, of course, be employed in view of its heat resistance. Furthermore, the filter may be formed of not only a textile fabric but also a non-woven fabric.

The bag filter 26 is inflated with the gas spouted from the inflator and is capable of collecting the cinders having predetermined or [more bigger] *larger* sizes to the inside thereof because of its air permeability. The tube is then inflated with the gas passing through the bag filter 26. At this stage, as the gas temperature is lowered, the bag filter effectively acts as a filter and a diffuser.

The skirt is overlapped around the tongue to effectively display its heat resistance while considering the temperature distribution as shown in FIG. 2.

Though the aramid fiber is employed in this embodiment as described above, the fiber may be carbon fiber, alumina fiber, silicon-carbide fiber or glass fiber, each of which has high heat resistance.

The carbon fiber has an extremely high heat resistance because it is made by burning and carbonizing organic fiber. Therefore, the heat resistance of the carbon fiber is expected to withstand approximately 2000° C. if the carbon fiber is employed as a diffuser which receives no load as described in the present invention.

The alumina fiber as an oxide inorganic material has also very high heat resistance and is convenient as a textile.

FIG. 8(a) is a sectional view showing a structure of an end between the inflatable portion 25 and the webbing 10, i.e. the inner belt 21 located inside the inflatable portion 25, near a slip guide side.

As the structure is now be described again, the end of the knitted textile member 23 is integrally glued to the end 20d of the cover 20 by the adhesive and is firmly sewn to the webbing 10. The end 22a of the tube 22 made of silicon rubber is welded or glued to the inner belt 21 within the knitted textile member 23. The end of the bag filter 26 described above is located inside the tube 22.

FIG. 8(b) shows a modification of the example shown in FIG. 8(a). The end of the knitted textile member 23 is integrally glued to the end 20d of the cover 20 by the adhesive and is firmly sewn to the webbing 10 at a predetermined position. The inner belt is cut near the end 22a of the tube 22 where the inner belt 21 is fixed to the tube 22. Only the cylindrical bag filter 26 having the same function as described above is accommodated in the tube 22.

In this embodiment, the inflatable portion 25 works as a "webbing" in a crash or the like where the gas generating means does not work. The inflatable portion 25 expands slightly in the longitudinal direction because of the elongating characteristic of the knitted textile member 23. Therefore, the inflatable portion 25 and the webbing 10 can receive a tensile force of the belt so as to restrain the occupant properly.

The inflatable portion 25 is inflated in a suitable form as in the embodiment shown in FIG. 8(a) at a crash so as to restrain the occupant at the wide area of the inflatable portion 25.

Figure 9:
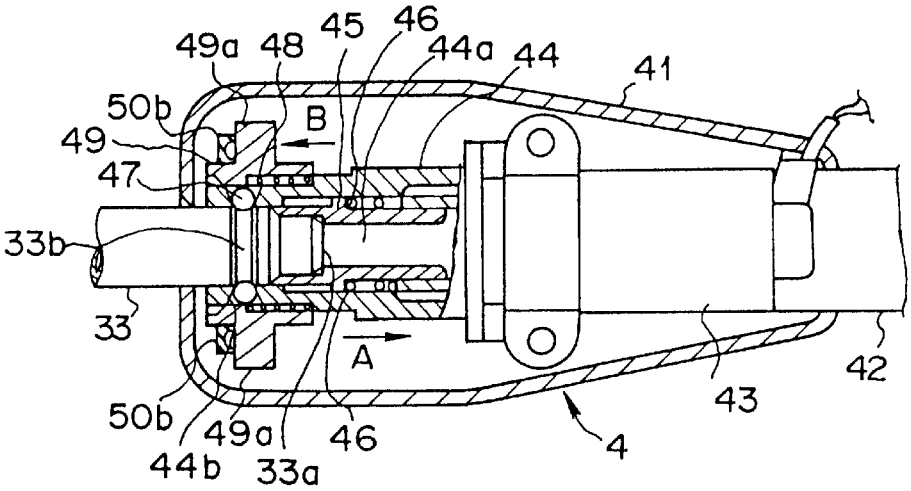
FIG. 9 is a cross sectional view showing a simplified structure of an engaged portion of a buckle according to the present invention.
Figure 10:
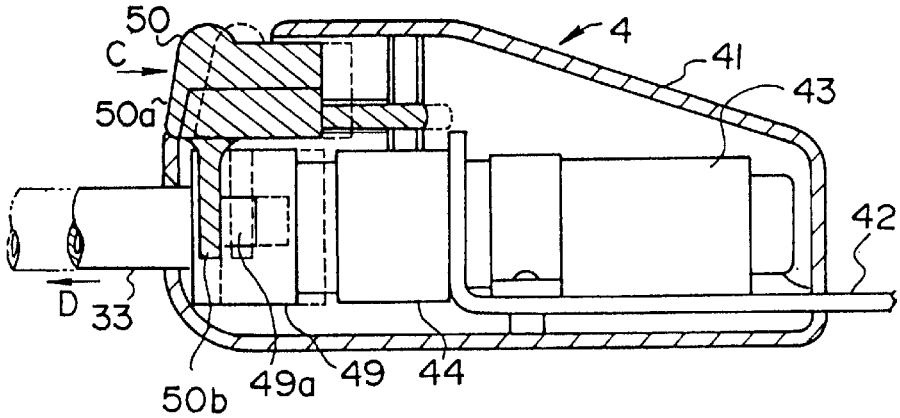
FIG. 10 is a longitudinal sectional view showing a releasing operation of the tongue by a press button of the buckle.
Figure 11:
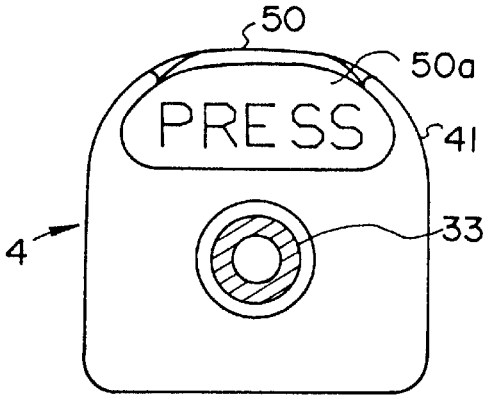
FIG. 11 is an end view showing a front face of the buckle.

FIGS. 9–11 are explanatory drawings showing embodiments of the buckle. The buckle 4 supports a tongue pipe 33 and has the gas generating means. The buckle 4 introduces the produced gas from the gas generating means through a gas path 34 in the tongue pipe 33.

The "coupling" between the buckle 4 and tongue 3 is achieved by engaging a tubular groove 33b disposed on the peripheral surface of a distal end of the tongue pipe 33, to metal balls 47 inserted in tapered holes of coupling hole 44a formed in the buckle 4. Each of the metal balls 47 has a portion projecting from the inner surface of the coupling hole 44a.

In FIG. 9, numeral 41 designates a housing in which a portion of a flange plate 42 is fixed. The buckle 4 is secured by the flange plate 42 to the housing 41 near the floor of the vehicle (not shown). In the housing 41, a gas generator 43 as the gas generating means is fixed to the flange plate 42. The gas generator 43 is firmly connected to a buckle body 44 acting also as a gas passing pipe.

FIG. 9 shows a state of coupling the tongue pipe 33 to the coupling hole 44a. As shown in the figure, when the tongue pipe 33 is coupled to the coupling hole 44a of the buckle body 44, a tongue pipe releasing ring 45 is pressed against a biasing force of the spring 46 by the tongue pipe distal end 33a in a direction of the arrow A.

[While, tapered] *Tapered* holes 44b are formed at a peripheral surface of the buckle body 44 at predetermined intervals. The metal ball 47 is inserted in each tapered hole 44b to be able to move from the peripheral surface side of the buckle body 44 so that a portion of the metal ball 47 projects from the inner surface of the coupling hole 44a. When the tongue pipe 33 is coupled to the coupling hole 44a, each of the metal balls 47 is pressed from the peripheral surface side of the buckle body by a release operation ring 49 biased by a spring 48 in a direction of the arrow B. Therefore, one portion of the metal ball 47 projects into the tubular groove 33b disposed on the peripheral surface of the tongue pipe 33 to press and bear the tubular groove 33b of the tongue pipe 33, so that the tongue pipe 33 is coupled and fixed inside of the coupling hole 44a.

[While, release] *Release* of the tongue pipe 33 is accomplished by pressing a press button 50 disposed on one portion of the housing in a direction of the arrow C as shown in FIG. 10.

The press button 50 is an operational button of non-encircle type and has a pressing face 50a disposed at an upper front position of the housing as shown in FIG. 11. Therefore, the occupant can operate the button 50 by one action.

[The description will now be briefly made as regard to a] *A* mechanism of releasing the tongue 3 from the buckle 4 *will now be described.*

As the press button 50 is pressed in the direction of the arrow C as shown in FIG. 10, a protuberance portion 49a of the release operational ring 49 is pressed by an operational arm 50b mounted on the press button 50 in the direction of the arrow C, so that the release operational ring 49 slides against a biasing force of spring 48 in the direction of the arrow C to release the pressure of the metal ball 47 from the release operational ring 49. Therefore, the metal balls 47 are released from the tubular groove 33b of the tongue pipe 33. As a result, the tongue pipe releasing ring 45 in the buckle body 44 is biased by a spring 46 in a direction of the arrow D to push out the tongue pipe 33 from the inside of the buckle body 44 and then the tongue 3 is released from the buckle 4.

FIGS. 12(a), 12(b) are explanatory drawings showing modified filters 26, 26A.

In the embodiment described before, to improve the heat resistance around the tongue 3 where the temperature of the spouted gas is high, the skirt 27 is mounted inside of the bag filter 26 as shown in FIG. 7. However, touch of the belt and feeling when wearing the belt are bad because the belt has a thick portion by the overlapping structure. The modifications as shown in FIGS. 12(a) and 12(b) are the bag filters structured by only one piece.

For the bag filter 26 shown in FIG. 12(a), a textile having different fabric thickness which is formed of aramid fiber is employed to vary the performance of heat resistance along the longitudinal direction. For a portion around the tongue, a thick fabric 26A which has higher heat resistance is employed in order to lower the temperature of the diffuser. For the head, a sheer fabric 26B which has lower heat resistance is employed to mainly obtain a filter effect. It is possible that different kinds of heat-resistance fibers are combined and sewn. That is, a higher heat-resistance fiber may be used around the tongue and a sheer aramid fiber fabric may be used around head.

FIG. 12(b) illustrates an example that a metal film coating such as aluminum is provided to an inner surface of the bag filter 26 for a range corresponding to the skirt part. Though the coated range has non-air permeability, the thermal insulation effect is improved at the tongue portion. Therefore, the temperature in the tube is equalized and the highest temperature around the tongue is lowered.

The range to be coated is preferably set with reference to the gas flow as shown in FIG. 13.

That is, the shoulder belt, i.e. the tube 22, the inner belt 21 and the bag filter 26, is curved gently around the tongue to fit to the body of the occupant D. In this state, an elbow part 26a of the bag filter 26 is hit directly and intensively by the heat flow when the gas is spouted from the inflator (not shown). Therefore, the temperature of the elbow part 26a is raised partially to quite *a* high temperature. Since the bag filter is employed not to directly provide radiant heat in this embodiment, it is necessary to deal with such partial and continuous heating. Therefore, preferably, the elbow part 26a is provided with the above described coating or [2] *two* sheets *of* textile fabrics are overlapped at this part.

We claim:

1. An inflatable seat belt for restraining movement of an occupant in a vehicle, comprising:

a webbing attached to the vehicle and extending for restraining movement of the occupant;

an inflatable portion formed over a part of the webbing and contacting the occupant when the webbing is worn, said inflatable portion including a cylindrical skirt disposed on one side of the webbing and formed of a heat resisting material; a filter directly attached to and completely surrounding the skirt; an elastic inflatable tube having an elongated shape and completely surrounding the webbing and the filter containing the skirt, said elastic inflatable tube having heat resistance and being fixed to the webbing; and a knitted member in a flat form and connected to the webbing to cover the entire inflatable tube, said knitted member having an elasticity in a direction perpendicular to a longitudinal direction of the webbing;

a tongue fixed to the skirt and having a gas flow path therein; and a buckle attached to the vehicle and engagable to the tongue, said buckle having a [port] *body* to supply hot gas to the inflatable portion through the gas flow path of the tongue, said hot gas flowing through the skirt and passing through the filter to lower temperature of the hot gas so that the inflatable tube is inflated by the gas while the knitted member is expanded by enlargement of the tube.

2. An inflatable seat belt according to claim 1, wherein said inflatable portion formed of the skirt, the filter, the inflatable tube and the knitted member is [a] laminated [and not folded].

3. An inflatable seat belt according to claim 2, wherein said inflatable portion further includes a [non-expandable] cover for covering the knitted member, said cover being sewn by a thread along the longitudinal direction of the webbing so that when the inflatable tube is inflated, the thread is torn to allow the inflatable tube to inflate easily.

4. An inflatable seat belt according to claim 3, wherein said skirt has a length of about one third of the length of the filter.

5. An inflatable seat belt according to claim 4, wherein said inflatable portion further includes an end fitting situated inside the skirt and a caulking fitting situated over the cover to sandwich the skirt, the filter, the inflatable tube and the knitted member therebetween, said tongue passing through the end fitting and the caulking fitting.

6. An inflatable seat belt according to claim 5, wherein said elastic inflatable tube is made of silicone rubber.

*7. An inflatable occupant protection device comprising:*

*an elongated webbing;*

*an inflatable member;*

*a bag filter disposed within the inflatable member which filters gas flowing into the inflatable member upon inflation thereof; and*

*a fabric member connected to the elongated webbing to cover the inflatable member;*

*wherein the fabric member expands in a direction transverse to a longitudinal direction of the elongated webbing upon inflation of the inflatable member, thereby pre-tensioning the elongated webbing.*

*8. An inflatable occupant protection device according to claim 7, wherein the inflatable member includes a skirt disposed within the bag filter.*

*9. An inflatable occupant protection device according to claim 8, wherein the skirt is formed of a heat resisting material.*

*10. An inflatable occupant protection device according to claim 8, wherein the fabric member is a knitted fabric member that is easily expandable in the direction transverse to the longitudinal direction of the elongated webbing.*

*11. An inflatable occupant protection device according to claim 7, further comprising a tongue having a gas flow path therein, the tongue being connected to the inflatable member.*

*12. An inflatable occupant protection device according to claim 11, further comprising a buckle for engaging the tongue, the buckle having a body to supply gas to the inflatable member through the gas flow path of the tongue.*

*13. A method for providing occupant protection comprising the steps of:*

*attaching an elongated webbing to a vehicle;*

*fixing to the elongated webbing an inflatable member, the inflatable member being covered by a fabric member which is connected to the elongated webbing, the fabric member pre-tensioning the elongated webbing upon inflation of the inflatable member by expanding in a direction transverse to a longitudinal direction of the elongated webbing; and*

*disposing a bag filter within the inflatable member, the bag filter filtering gas flowing into the inflatable member upon inflation of the inflatable member.*

*14. A method for providing occupant protection according to claim 13, further comprising the step of disposing a skirt within the inflatable member.*

*15. A method for providing occupant protection according to claim 14, wherein the step of disposing a skirt within the inflatable member comprises disposing a skirt formed of a heat resisting material within the inflatable member.*

*16. A method for providing occupant protection according to claim 13, further comprising the step of connecting a tongue to the inflatable member, the tongue having a gas flow path therein.*

*17. A method for providing occupant protection according to claim 16, further comprising the step of providing a buckle for engaging the tongue, the buckle having a body to supply gas to the inflatable member through the gas flow path of the tongue.*

*18. A method for providing occupant protection according to claim 13, wherein the step of fixing to the elongated webbing an inflatable member comprises fixing to the elongated webbing an inflatable member that is covered by a knitted fabric member that is easily expandable in the direction transverse to the longitudinal direction of the elongated webbing.*

* * * * *